United States Patent [19]
Hutchin

[11] Patent Number: 4,584,484
[45] Date of Patent: Apr. 22, 1986

[54] MICROSCOPE FOR PRODUCING HIGH RESOLUTION IMAGES WITHOUT PRECISION OPTICS

[76] Inventor: Richard A. Hutchin, 56 Framingham Rd., Marlboro, Mass. 01752

[21] Appl. No.: 538,764

[22] Filed: Oct. 3, 1983

[51] Int. Cl.[4] .............................................. G02B 21/06
[52] U.S. Cl. .................................... 250/550; 250/573; 350/509; 356/359
[58] Field of Search ....................... 250/550, 573-576; 356/35.5, 359, 360; 350/509

[56] References Cited

PUBLICATIONS

Preater; "In-Plane Strain Measurement on Large Rotating Structures"; Electro-Optics/Laser International '80 UK; Mar. 25-27, 1980; pp. 133-138.

Jones; "The Design and Application of a Speckle Pattern Interferometer for Total Plane Strain Field Measurement"; Optics & Laser Tech.; Oct. '76; vol. 8, No. 5, pp. 215-219.

Primary Examiner—Edward P. Westin
Attorney, Agent, or Firm—Michael H. Wallach; Robert F. Rotella

[57] ABSTRACT

A microscope, not employing conventional optical elements, is disclosed wherein a sample under examination is subjected to a moving pattern of illumination having alternate light and dark interference fringes, and having a spatial frequency which varies during the motion of the fringes over the sample in a first direction, in order to obtain the sine components of the optical image of the sample. The light reflected off of the sample is gathered by a wide angle light detector to produce electrical signals which in turn result in the recording of a set of signals proportional to the intensity of the light reflected from the sample during a plurality of signal sampling intervals. Another set of signals is recorded after the direction of relative motion between the pattern and the sample is changed by about 1°, for example, and so on until electrical data is recorded for a considerable number of "fourier slices" across the sample object. Data indicative of the phase and amplitude values of the fourier components of the resulting signals is extracted, and fourier transformation is thereafter carried out for producing image data enabling the high resolution reconstruction of the optical image of the specimen.

25 Claims, 6 Drawing Figures

MICROSCOPE FOR PRODUCING HIGH RESOLUTION IMAGES WITHOUT PRECISION OPTICS

BACKGROUND OF THE INVENTION

The present invention relates to the field of viewing devices which employ sinusoidal patterns of illumination for examining objects and producing high resolution images thereof, and is readily applicable to the field of microscopy.

In the literature, one finds the suggestion of illuminating an object with an interference fringe pattern formed by laser beams in order to measure the amplitude of a fourier component. However, there is no known teaching as to how one can apply this suggestion to the construction of a viewing device such as a microscope. More particularly, there is no teaching as to how one can measure the phase of the fourier components nor how the different fringe patterns required are to be created to produce a practical apparatus. While the production of interference patterns at the specimen viewed by a microscope is known in the art, there is no known prior art which teaches the method and apparatus of the present invention. For example, the interference pattern produced by the arrangement of U.S. Pat. No. 3,162,713 is employed to obtain visual contrast and does not otherwise teach the present invention. Other prior art U.S. Pat. Nos. 3,495,890; 3,511,554; 3,180,216; 3,558,210; and 3,182,551 all illustrate various microscopes which require precision optical components in contrast with the present invention, which has a principal object to eliminate expensive, precision optical components.

It is thus an object of the present invention to provide a new form of microscopy which is capable of producing high resolution with a large depth of field without precision optical components.

While the present invention in its preferred form is directed to the use thereof as a microscope, other applications may involve telescopes, video cameras or other viewing systems where one might wish to recover only a few fourier components to obtain partial or enhanced structural information, alignment information, or the like.

SUMMARY OF THE INVENTION

One embodiment of the invention is directed to producing a representation of a localized sample or scene under examination, which involves exposing such localized sample to a moving sinusoidal interference fringe pattern produced by interference of wave energy directed at said sample, such pattern having interference fringes which have a spatial frequency which varies between a first and second value during the motion or passage of the fringe pattern over the sample in a first direction. During each pass of the moving fringe pattern over the sample, a set of signals are recorded proportional to the intensity of the wave energy transmitted from the sample (by reflection or transmission therethrough) during a plurality of sampling intervals. Another set of signals is produced after the direction of relative motion between the image of the moving fringe pattern and the sample is slightly changed by rotating the sample or beam in steps, and the recording of signals mentioned above is repeated until "fourier slices" in a considerable number of directions occur. The recorded data is thereafter processed by extracting phase and amplitude values of at least some of the fourier components of the recorded signals (which contain information equivalent to the fourier components of the image of the physical specimen measured at high resolution) and fourier transformation is thereafter carried out for producing data which may be employed in reconstructing an optical image of the sample or scene under examination. It is believed feasible to examine the viewed object or scene by means of any type of wave energy capable of producing interference patterns such as visible light, sound, x-rays, radio waves, gamma rays, infrared and ultraviolet wave energy. Applications involving x-rays could be of extreme importance in the medical, astronomical and industrial fields as the invention does not require high precision focusing devices and collimated x-rays may be employed.

In accordance with one embodiment of the invention which may be employed as a microscope, a sample under examination is subjected to a moving pattern of illumination having alternate light and dark interference fringes and having a spatial frequency which varies during the motion of the fringes over the specimen in a first direction in order to obtain the sine components of the optical image of the scanned localized sample of the specimen. The light reflected off of the sample is gathered by a wide angle light detector, and produces input information which in turn results in the recording of a set of signals proportional to the intensity of the light reflected from the localized sample during a plurality of sampling intervals. Another set of signals is recorded after the direction of relative motion between the grating image and the sample is changed by about 1°, for example, and so on until data is recorded for a considerable number of "fourier slices" across the object. Data indicative of the phase and amplitude values of the fourier components of the resulting signals is extracted and fourier transformation is thereafter carried out for producing image data enabling the reconstruction of the optical image of the sample. The "spatial" frequency of the fringes is changed, in one embodiment, by directing coherent light simultaneously at the portion of the specimen under examination and at the portion of the specimen under examination and at the surface of a planar mirror positioned at right angles with respect to a plane passing through the specimen, which produces interference fringes at the specimen. By varying the angle of the light incident upon the mirror and specimen, the spatial frequency of the scanning pattern may be changed in a controlled manner. More specifically, a cylindrical mirror may be positioned about the planar mirror adjacent the specimen support platform, and a rotatable scanning mirror directs a laser beam at the cylindrical mirror, to in turn produce the variable angle beam directed at the specimen and planar mirror. In a second embodiment, the above-mentioned angle between the light beam and the planar mirror is maintained constant, and the wavelength of a tunable laser, for example, may be changed, thereby to change the "spatial" frequency of the fringe pattern produced upon the sample of the specimen under examination.

Other objects, features and advantages of the present invention will become apparent upon study of the following description taken in conjunction with the drawings in which:

FIG. 1 discloses the use of a planar mirror for forming the fringe pattern over the specimen;

DETAILED DESCRIPTION

Figure 1:
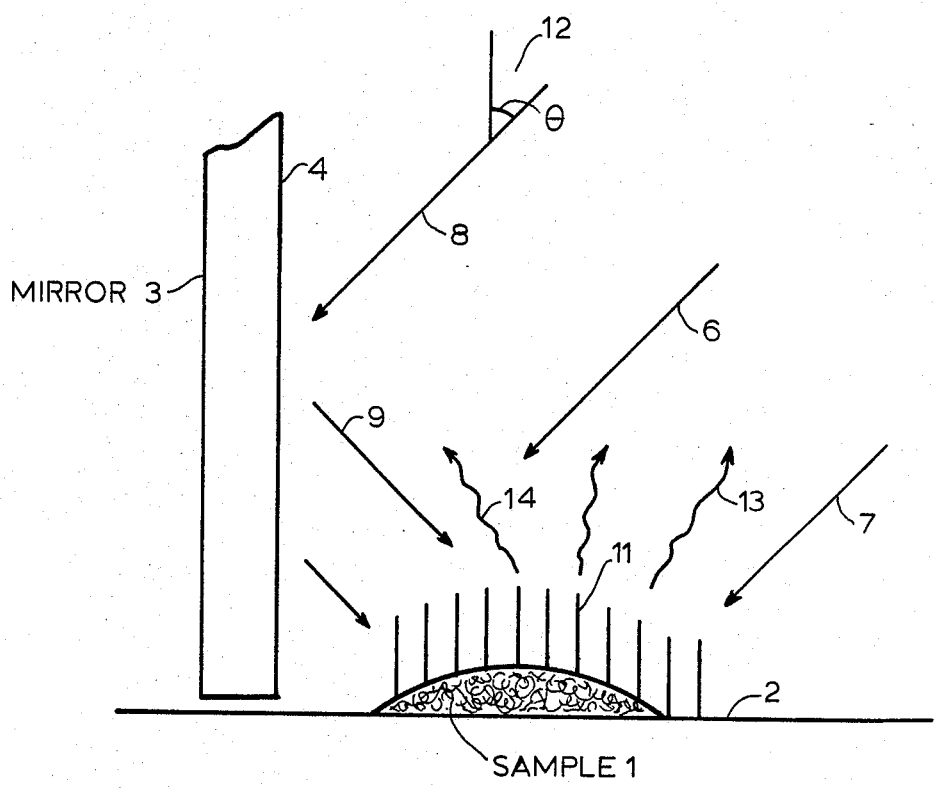

Referring now to FIG. 1, a sample of the specimen under examination 1, is schematically illustrated, positioned upon a base member 2 which is perpendicular to vertically oriented mirror 3 having a specular reflective surface 4. Generally, the sample under examination will consist of only a small portion of the total specimen to be viewed, and an aperture device is positioned over the sample, such device being mentioned hereinbelow. Incident coherent light produced, for example, by a laser, is directed at the specimen as indicated by rays 6 and 7, and is also directed at mirror 3 as indicated by ray 8, which in turn is reflected as indicated by ray 9, whereby the angle of reflection is equal to the angle of incidence. The result is that a fringe pattern 11 is produced due to interference between the reflected light and the light directly illuminating sample 1, the spatial frequency between fringes being a direct function of the angle theta illustrated at 12. In the preferred embodiment, angle theta may be reduced from about 70° to nearly zero degrees to cover a wide range of "spatial" frequencies. Light scattered over a wide angle represented by arrow 13 and 14, is collected by a lens or mirror, and is directed at a photoelectric detector, not shown in the FIGURE, but discussed below. The scattered light collecting optical members may be of a low optical quality relative to the final resolution of the image to be reproduced. This is in contrast to the use of high quality optical components in prior art viewing devices such as microscopes.

Figure 5:
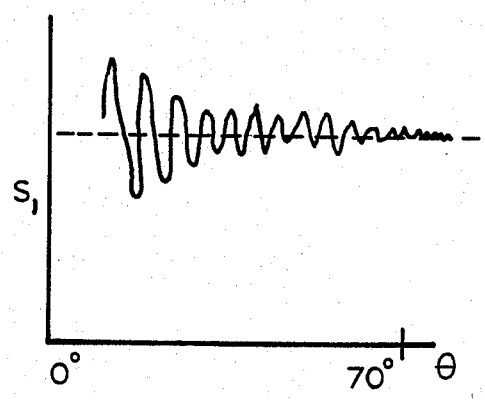
FIG. 5 illustrates the detector signal at lead 34.
Figure 3:
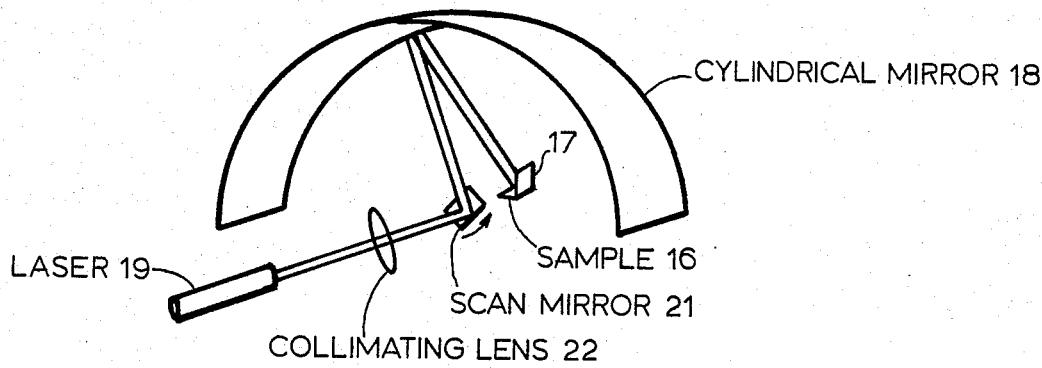
FIG. 3 illustrates a preferred optical arrangement for changing the angle of incidence of the light directed at the structure of FIG. 1.

Referring now to FIG. 3, sample support plate 16 and vertical mirror 17 for creating the fringe patterns, is positioned as shown. Cylindrical mirror 18 is positioned about the specimen and mirror, and a coherent light generator such as laser 19, directs a beam of light at a rotatable scan mirror 21 which in turn directs a beam of collimated coherent radiation at the vertical mirror and sample via cylindrical mirror 18. Collimating lens 22 is preferably positioned between laser 19 and scan mirror 21. Rotation of the scan mirror will in turn produce the desired changes in the angle of incidence theta, mentioned above, and fringes will be generated having a varying spatial frequency as the angle theta changes. An analog to digital converter, not shown, is coupled to the drive mechanism which rotates scan mirror 21 to accurately establish values of theta so that the fourier phase information may be extracted with a high degree of perfection, and the need for a point reference is eliminated. To obtain phase accuracy of one-twentieth of a cycle, which is adequate for high quality imagery, it may be shown that a sixteen bit encoder will suffice. It is important to note that the mirror serves as a phase reference, since the fringe pattern is always a maximum at the mirror. The object illuminated must be placed at a distance twice its diameter or more from the mirror surface. The fringe pattern may be visualized as an accordian bellows, having a side portion affixed in place at the mirror surface, such bellows being expanded, as "spatial" frequency of the fringes is reduced, during each cut in fourier space. As the beam angle theta varies from $0-\pi/2$ radians, the fringe pattern spatial frequency varies from 0–2 cycles per wavelength of light; the pattern period is equal to the wavelength of light/2 sin theta. FIG. 5 illustrates the intensity of a typical scattered light signal $S_1$ as a function of beam angle theta. Note as theta increases, there is a general decrease in amplitude and period. The nature of this signal will be amplified hereinafter.

Where the invention is employed as a microscope, the input laser beam should be of a small diameter to limit power (i.e., about 1 mm) and should stay centered on the sample as the beam rotates. It should be thus apparent that the cylindrical mirror 18 directs the beam to the sample and vertical mirror, regardless of the rotational position of the scan mirror. The aberrations in this optical system are negligible where a 1 mm light beam is employed, as long as the radius of the cylindrical mirror is greater than about 1 inch. Thus, scanning over a quadrant or more is easily accomplished by the FIG. 3 arrangement. Furthermore, since the optics are reflective, except for collimating lens 22, this arrangement will function satisfactorily at all wavelengths.

Figure 2:
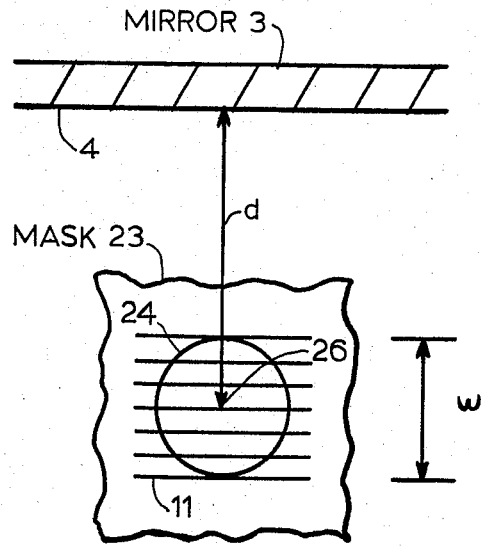
FIG. 2 illustrates the relationship between the viewing aperture positioned over the specimen and the vertical side wall of the mirror of FIG. 1.
Figure 4:
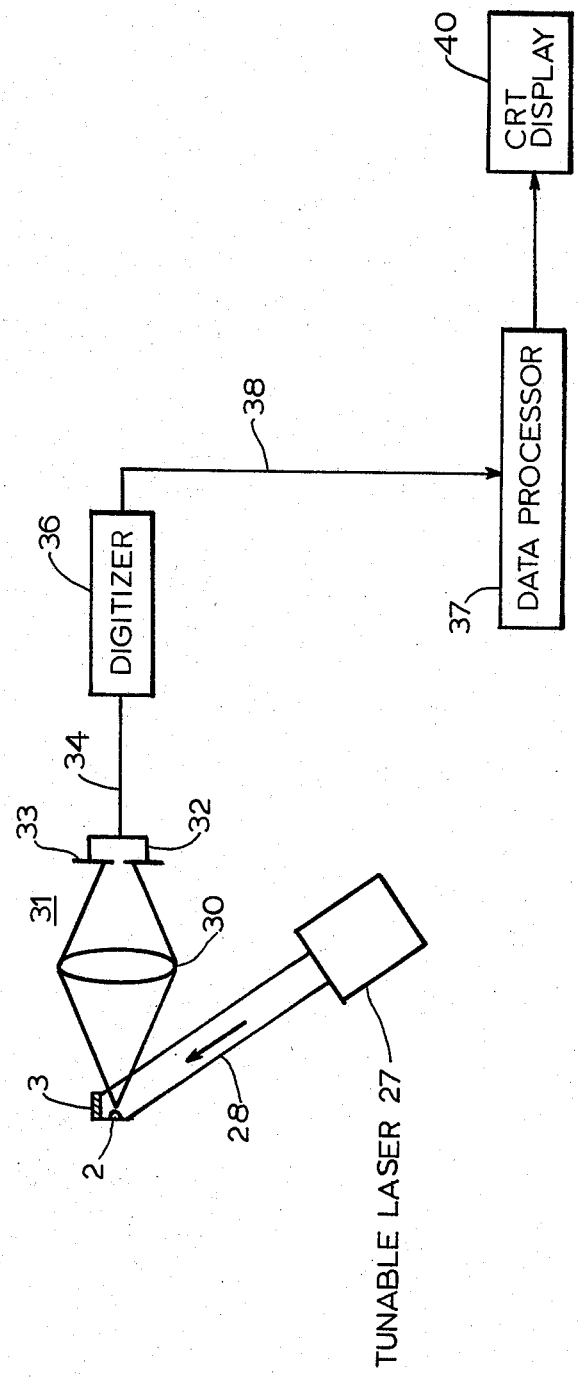
FIG. 4 illustrates a second embodiment, employing a tunable laser together with certain components which would also be employed in connection with the first embodiment.

It is desirable to localize a portion of the entire specimen so that the interference fringe pattern is directed on such portion which may be termed a sample under examination. To effect such localization, the illuminating device could be masked, the lens light bucket collector mentioned above may be field stopped, or a mask may be positioned over the sample, or in the case of light transmitted through the sample, under the sample. Alternatively, as explained hereinafter, a low resolution imaging system may be used to define multiple regions within the sample area, each of which region will be separately analyzed for fourier components. Then all of the reconstructed high resolution regions could be overlaid like tiles in a mosaic, to produce a much higher resolution image of the larger sample region. In the preferred embodiment described, reflected light is employed to retrieve the fourier components of the image and a mask will be positioned over the sample. Such a mask 23 is schematically illustrated in FIG. 2, and includes aperture 24 having a center point 26 formed therein. In FIG. 4, tunable laser 27 directs laser beam 28 at the sample on base member 2 and vertical mirror 3. A lens light collector or bucket 31, which includes a low optical quality lens 30, refocuses the widely scattered light at photodetector 32 via field stop 33. The resulting electrical signals at output 34 of detector 32 will be proportional to the amplitude of the integral of the light scattered by the sample under examination over a wide angle. The wavelength of light produced by tunable laser 27 may extend over the range of 0.4 microns-1.5 microns during a single scan. Sampler digitizer 36, in effect chops the photodetector output signal at 34 and a set of signals is recorded therein proportional to the intensity of light scattered from the sample during a plurality of sample intervals within the single scan interval. The sample support member 2 is thereafter rotated by an angle phi of typically 0.01 radians, and the process is repeated so that sets of signals are recorded proportional to the scattered light for each scan or cut in fourier space, until the rotational stepping of the baseplate, e.g. through 180° is ended. From the resulting stored data, data processor 37 extracts data indicative of the phase and amplitude values of the fourier components of the signals and after this process is completed, the data processor fourier transforms the extracted data, which in turn produces image data which enables reconstruction of the optical image by well known fourier transform operations. Such image data could be stored on magnetic media for future use or could be transmitted to a CRT display unit 40 which recreates the optical image of the localized specimen portion under examination. The extent of travel of the CRT electron beam during given time periods may, of course, be varied by well known techniques. Should the worker in the art desire to increase image magnification, the CRT electron beam velocity and degree of travel will be increased, thereby to provide increased magnification of the displayed reconstructed optical image as is well known in the electronic display art. See U.S. Pat. No. 3,221,009.

While FIG. 4 illustrates a tunable laser 27, a fixed frequency laser and the optical arrangements of FIGS. 1 and 3 could be positioned surrounding the illuminated sample and planar mirror, so that the angle of the incident radiation is changed rather than the frequency, as previously discussed. However, the light collection devices 30-33 would be the same in either case as would the remaining components of FIG. 4.

A high resolution image of a viewed scene may be produced in accordance with the teachings of the invention by employing a relatively low resolution imaging system such as an ordinary television camera, to define multiple regions within the area of the scene. Each multiple region may be separately analyzed for fourier components, which may be processed in a data processor in a manner similar to the data processed by the other embodiments of the invention. The resulting reconstructed high resolution regions could be overlaid like tiles in a mosaic to produce a much higher resolution image of the scene under examination than the resolution of the image attainable by the low resolution imaging system alone.

Figure 6:
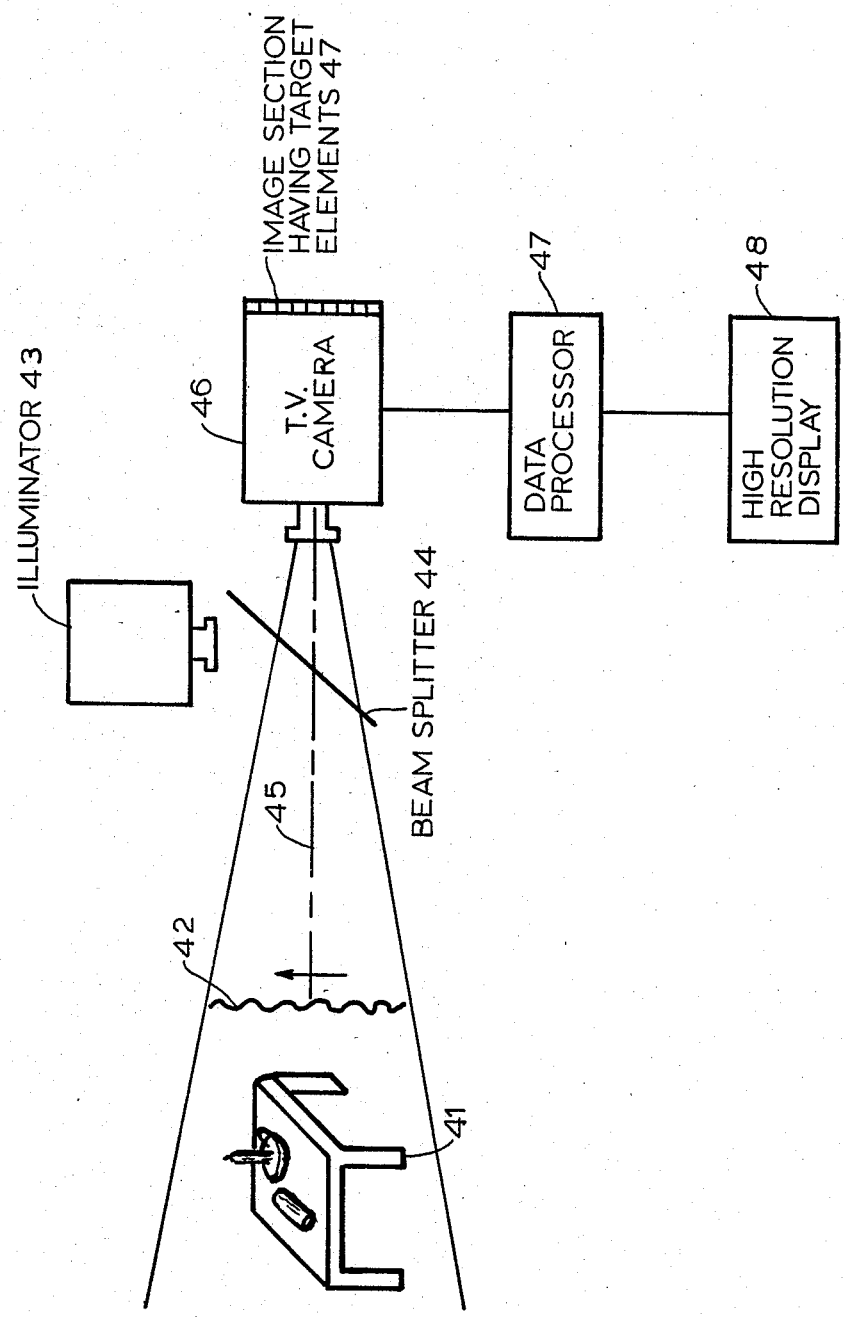
FIG. 6 illustrates another embodiment for increasing the resolution of a T.V. camera.

In FIG. 6, a scene under examination 41 is illuminated by a sinusoidal moving energy pattern 42 which is essentially the same as the above-mentioned moving patterns. This illumination process may be facilitated by employing a projector or illuminator 43 for projecting the sinusoidal image 42 upon the scene via beam splitter 44 along optical axis 45. An ordinary T.V. camera 46 would be positioned as indicated, to view the scene 41 illuminated by pattern 42. An image section 47 is indicated having the standard T.V. camera target screen for converting an optical image into an electronic video signal, such imaging section having a given number of target elements as is well known. Since the number of target elements are relatively limited compared to the number of image elements or pixels focused upon section 47, it would be desirable to greatly enhance the resolution of the image produced by the T.V. camera. Such process may be effected by individually processing the data gathered from each target element within the imaging section in the manner described below. Fourier transformation is carried out in data processor 47 and the resulting data may be applied to a high resolution display 48, which will produce an image of the scene 41 of far greater resolution than the image which could be produced by T.V. camera 46, in the absence of the teachings of the invention.

Furthermore, it is believed feasible to illuminate scene 41 with a sinusoidal energy pattern of energy other than light, such as acoustic energy, for example. In this case the T.V. camera would be replaced by an array of microphones, together with an acoustic lens for focusing sonic energy emitted from scene 41 upon such array. Other forms of energy may be employed in accordance with the teachings of this aspect of the invention.

While the manipulation of data within data processor 37 has not been described in considerable detail in the interest of clarity, brevity and economy, the skilled worker in the art with a knowledge of fourier transform techniques will be able to readily provide the hardware and software called for, particularly in view of the following further explanation.

Let us consider the embodiment shown in FIG. 1 where a region of sample 1 is illuminated by interference pattern 11 at angle 12, denoted $\theta$. With a fixed wavelength $\lambda$, we will scan from $\theta=0°$ to $\theta=70°$ and measure the light scattered from the local region 24 of the sample shown in FIG. 2; the local region is of diameter w, and its center 26 is a distance d from the reference mirror 4. After each scan, the sample will be rotated by angle $\Delta\phi$, with the axis of rotation at point 26 and a new scan will be performed as previously mentioned.

The spatial frequency of the illumination pattern is given by:

$$K = \frac{4\pi}{\lambda} \sin \theta \text{ radians/unit length}$$

and varies from near zero to $K_{max} \approx 4\pi \sin 70°/\lambda$.

The signal received at detector 32 is a phase and amplitude modulated sine wave, as shown in FIG. 5, which differs in detail for each angle $\phi$ of sample rotation. Its value is given by:

$$S_1(\theta,\phi) = I_o \int dxdy I(x,y)w(x,y)\left[ 1 + \cos\left(\frac{4\pi}{\lambda} \sin \theta(x \cos \phi + y \sin \phi + d)\right)\right]$$

where:
$\theta$=angle of incident laser beam
$\phi$=angle of sample rotation relative to the initial position of the sample
w(x,y)=transmission function of window 24 which is unity inside the window and zero outside
I(x,y)=target intensity pattern to be determined
$I_o$=a constant proportional to the average intensity level of the signal
$[1+\cos(4\pi/\lambda \sin \theta(\ldots))]$=fringe pattern incident on the target.

The object of the data recording and processing is to use the signal $S_1(\theta,\phi)$ for a number of values of $\theta$ and $\phi$ to obtain information about the target intensity I(x,y).

In this case, sample the signal $S_1$ during a scan in $\theta$ every time Kd changes by ¼ cycle ($\pi/2$ radians) which is equivalent to sampling every time K change by $\pi/2d$. This corresponds to a change in $\theta$ by $$\Delta\theta = \frac{\lambda}{8d\cos(\theta)}$$

Samples will be taken "closer" in $\theta$ for small values of $\theta$ and farther apart in $\theta$ as $\theta$ approaches 70°, since K changes more slowly with $\theta$ at larger angles.

Step $\phi$ from $\theta$ to $\pi$ radians (180°) in units of $2r/w$ radians where r=smallest sample element (resolution) desired in the final image and w=sample width shown in FIG. 2.

Digitize and record all measurements of the detector signal $S_1$.

With the recorded data, one may solve for I(x,y) as follows:

For each $\phi$ value, calculate $$S_2(Z,\phi) = \sum_{K=0}^{K_{max}} S_1\left(\sin^{-1}\left(\frac{\lambda K}{4\pi}\right),\phi\right) e^{-iZK}$$

where K is stepped in units of $\pi/2d$.

Here $i=\sqrt{-1}$, Z is a variable corresponding to a position within the sample window and $K_{max} \approx 4\pi \sin 70°/\lambda$. Calculate the above sum for all values of Z given by $d-w/2 \leq Z \leq d+w/2$ in steps of r.

$S_2(Z,\phi)$ represents a one-dimensional reconstruction of the sample image along one angular direction $\phi$.

Next calculate $$S_3(K,\phi) = \sum_{Z'=-w/2}^{w/2} S_2(Z'+d,\phi)e^{iZK}$$

where Z' is stepped in units of r.

Calculate the above sum for all values of K given by $-\pi/r \leq K \leq \pi/r$

With K stepped in units of $2\pi/w$ which is the fundamental fourier component for a sample of width w.

$S_3$ is now one cut in the fourier transform of the sample intensity I(x,y) along direction $\phi$. The transform from $S_1$ to $S_2$ to $S_3$ has removed the sinusoidal carrier from the signal and recovered the conventional fourier components of the sample image.

One may now find the image I(x,y) in polar coordinates (p,$\phi$) by $$I(P,\phi) = \sum_{K=-\frac{\pi}{r}}^{\pi/r} \sum_{\phi'=0}^{\pi} |K|S_3(K,\phi')e^{iK\cos(\phi-\phi')}$$

This sum should be performed with K and $\phi'$ stepped in units of $2\pi r/w$ and $2r/w$ respectively.

To I(x,y) in normal cartesian coordinates, let $p=\sqrt{x^2+y^2}$ and $\phi=\tan^{-1}(y/x)$ and evaluate the sum for each cartesian point (x,y).

Methods and apparatus other than those mentioned or described, are intended to be included within the scope of the invention, which is only to be restricted by the following claims, and equivalents.

I claim:

1. A method producing a representation of an optical image of a sample under examination comprising the steps of:

a. exposing said sample to a moving sinusoidal intensity pattern of known phase and having alternate light and dark interference fringes having a spatial frequency which varies between a first and second value during the motion of said pattern over said sample in a first direction;

b. recording a set of signals proportional to the intensity of light transmitted from said sample during a plurality of sampling intervals as step a is performed;

c. changing the direction of relative motion between the image of said pattern and said sample under evaluation by given angles and repeating steps a and b for each directional change;

d. extracting data indicative of phase and amplitude values of at least some of the fourier components of the recorded signals resulting from performing steps a, b and c; and e. fourier transforming said data indicative of said phase and amplitude values for producing image data enabling reconstruction of the optical image of said sample.

2. The method as set forth in claim 1 further including the step of generating an optical image of said sample under examination in response to the production of said image data produced by carrying out step e.

3. The method as set forth in claim 2 including the step of employing said image data to modulate a light image producing beam.

4. The method as set forth in claim 3 wherein said light image producing beam is swept to a sufficient extent to produce a magnified image of said sample under examination.

5. The method as set forth in claims 1, 2, 3 or 4 wherein step b includes the step of collecting and integrating over a wide angle light transmitted from said sample under evaluation during the performance of step a.

6. A system for producing a representation of an optical image of a sample under examination comprising:

a. means for exposing said sample to a moving sinusoidal pattern having alternate light and dark bands of known phase having a spatial frequency which varies between a first and second value during each pass of said pattern over said specimen in a plurality of directions;

b. means for recording a set of signals proportional to the intensity of light transmitted from said sample during each pass of said pattern over said sample under examination in each of said directions;

c. means for extracting data indicative of phase and amplitude values of the fourier components of signals recorded by said recording means; and d. means for fourier transforming said data indicative of said phase and amplitude values of the fourier components of said signals recorded by said recording means for producing image data enabling reconstruction of the optical image of said sample under examination.

7. The combination as set forth in claim 6 wherein said means for exposing comprises a light reflecting means positioned transversely with respect to a specimen plane in which said sample lies and at a given distance therefrom to establish the phase of said pattern with respect to the positioning of said sample under examination together with light beam generating means for simultaneously illuminating said light reflecting means and said sample under examination with coherent light.

8. The combination as set forth in claim 7 further including light beam control means for changing the angle of incidence of said coherent light beam with respect to said light reflecting means for producing an interference pattern at said specimen under examination having a spatial frequency which varies as said angle of incidence varies.

9. The combination as set forth in claim 7 wherein said reflecting means comprises a planar mirror positioned substantially perpendicular to said specimen plane.

10. The combination as set forth in claim 8 wherein said reflecting means comprises a planar mirror positioned substantially perpendicular to said specimen plane.

11. The combination as set forth in claim 8 wherein said angle of incidence varies between about 0° to 70° during each pass of said grating over said specimen under examination.

12. The combination as set forth in claim 10 wherein said angle of incidence varies between about 1° to 70° during each pass of said pattern over said specimen under examination.

13. The combination as set forth in claim 8, 10, 11 or 12 wherein said light beam control means includes a cylindrical mirror positioned about said light reflecting means and said specimen under examination and further includes a rotatable scanning mirror positioned along the optical projection axis of said light beam generating means for redirecting light at said specimen under examination via said cylindrical mirror, thereby to vary said angle of incidence upon rotation of said scanning mirror.

14. The combination as set forth in claim 13 further including a light collimator positioned between said light source and said rotatable mirror.

15. The combination as set forth in claim 7 or 9 wherein said light beam generating means includes means for changing the wavelength of said light beam for producing an interference pattern at said specimen under examination having a variable spatial frequency.

16. The system of claim 6, 8, 9, 11, or 12 wherein said directions of passage of said pattern over said specimen under examination differ from one another by an angle of about 0.01 radians.

17. The combination as set forth in claims 6, 8, 9, 11 or 12 wherein said means for recording includes an input device having a light transducer that integrates light transmitted from said sample under examination over an extended angle.

18. The combination as set forth in claim 16 wherein said means for recording includes an input device having a light transducer that integrates light transmitted from said sample under examination over an extended angle.

19. A method of producing a representation of a scene under examination comprising the steps of:
a. exposing said scene to a moving sinusoidal pattern of known phase with alternate bands of maxima and minima of signal amplitude and having a spatial frequency which varies between a first and second value during the motion of said pattern over said scene in a first direction;
b. recording a set of signals proportional to the intensity of wave energy transmitted from said scene during a plurality of sampling intervals as step a is performed;
c. changing the direction of relative motion between said pattern and said scene under evaluation by given angles and repeating steps a and b;
d. extracting data indicative of phase and amplitude values of at least some of fourier components of the signals resulting from performing steps a, b and c; and
e. fourier transforming said data indicative of said phase and amplitude values for producing image data enabling reconstruction of said scene.

20. The method as set forth in claim 19 further including the step of generating an optical image of said scene under examination in response to the production of said image data produced by carrying out step e.

21. The method as set forth in claim 20 including the step of employing said imaga data to modulate a light image producing beam.

22. The method as set forth in claim 21 wherein said light image producing beam is swept to a sufficient extent to produce a magnified image of said scene under examination.

23. The method as set forth in claims 19, 20, 21 or 22 wherein step b includes the step of collecting and integrating over a wide angle wave energy transmitted from said scene under examination during the performance of step a.

24. A system for producing a high resolution presentation of an optical image of a scene under examination comprising:
a. means for exposing said scene to a moving sinusoidal pattern having alternate light and dark bands of known phase and having a spatial frequency which varies between a first and second value during each pass of said sinusoidal pattern over said scene in a plurality of directions;
b. means for recording a set of signals proportional to the intensity of light transmitted from said scene during each pass of said pattern over said scene under examination in each of said directions;
c. said means for recording further comprising a television camera having a given number of target elements in the image section thereof for resolving said optical image of said scene;
d. means for extracting a set of data indicative of phase and amplitude values of the fourier components of signals received by each of said target elements of said recording means to provide a plurality of sets of data; and
e. means for fourier transforming said sets of data indicative of said phase and amplitude values of the fourier components of said signals recorded by said recording means for producing image data enabling reconstruction of an optical image of said scene having a far greater resolution than images which said television camera is capable of resolving.

25. A system for producing a high resolution presentation of an image of a scene under examination comprising:
a. means for exposing said scene to a moving sinusoidal energy pattern of known phase having alternate bands of maxima and minima of signal amplitude and having a spatial frequency which varies between a first and second value during each pass of said sinusoidal pattern over said scene in a plurality of directions;
b. means for recording a set of signals proportional to the intensity of energy transmitted from said scene during each pass of said pattern over said scene under examination in each of said directions;

c. said means for recording further comprising an array of energy detectors having a given number of elements in the image section thereof for resolving said image of said scene, together with means for focusing said signals upon said array of energy detectors;

d. means for extracting data indicative pf phase and amplitude values of the fourier components of signals received by each of said target elements of said recording means; and e. means for fourier transforming said data indicative of said phase and amplitude values of the fourier components of said signals recorded by said recording means for producing image data enabling reconstruction of an image of said scene having a far greater resolution than images which said array of detectors is capable of resolving.

* * * * *